(12) United States Patent
Yasuda

(10) Patent No.: US 11,895,996 B2
(45) Date of Patent: Feb. 13, 2024

(54) FISHING REEL

(71) Applicant: GLOBERIDE, Inc., Tokyo (JP)

(72) Inventor: Hiromu Yasuda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 17/890,058

(22) Filed: Aug. 17, 2022

(65) Prior Publication Data

US 2023/0062263 A1 Mar. 2, 2023

(30) Foreign Application Priority Data

Aug. 26, 2021 (JP) .................................. 2021-137784

(51) Int. Cl.
*A01K 89/01* (2006.01)
*A01K 89/033* (2006.01)
*A01K 89/017* (2006.01)
*A01K 89/012* (2006.01)

(52) U.S. Cl.
CPC .......... *A01K 89/045* (2015.05); *A01K 89/012* (2013.01); *A01K 89/017* (2013.01)

(58) Field of Classification Search
CPC ............ A01K 89/01555; A01K 89/017; A01K 89/0178; A01K 89/0186; A01K 89/01912; A01K 89/05
See application file for complete search history.

(56) References Cited

FOREIGN PATENT DOCUMENTS

| CN | 100571509 | C | * | 12/2009 | |
|---|---|---|---|---|---|
| CN | 101856013 | A | * | 10/2010 | ........... A01K 89/017 |
| CN | 104012480 | A | * | 9/2014 | ........... A01K 89/017 |
| CN | 104222034 | B | * | 5/2019 | ......... A01K 89/0172 |
| JP | 2000166443 | A | * | 6/2000 | |
| JP | 2000201603 | A | * | 7/2000 | |
| JP | 2001224288 | A | * | 8/2001 | |
| JP | 2001340041 | A | * | 12/2001 | |
| JP | 2002142625 | A | * | 5/2002 | ........... A01K 89/017 |
| JP | 2015100295 | A | | 6/2015 | |
| KR | 20190021684 | A | * | 3/2019 | ........... A01K 89/012 |

\* cited by examiner

*Primary Examiner* — Emmanuel M Marcelo
(74) *Attorney, Agent, or Firm* — Oliff PLC

(57) ABSTRACT

A fishing reel according to one embodiment of the present disclosure is a fishing reel provided with a braked unit attached to a spool on which a fishing line may be wound, a braking unit that applies a braking force to the braked unit, a braking force adjustment unit that adjusts the braking force of the braking unit, a motor that drives the braking force adjustment unit, and a control unit that controls the motor, in which the control unit controls the motor to repeat forward and backward drive at a frequency in an audible range to allow the motor to generate a notification sound.

6 Claims, 4 Drawing Sheets

FISHING REEL

CROSS-REFERENCE TO RELATED APPLICATIONS

This application claims priority under 35 U.S.C. § 119 to Japanese Patent Application No. 2021-137784 filed on Aug. 26, 2021, in the Japanese Patent Office, the entire contents of which is hereby incorporated by reference.

BACKGROUND

The present disclosure relates to a fishing reel capable of generating a notification sound to a user.

FIELD

Conventionally, in an electric reel and the like, a state of the reel is transmitted by generating a notification sound at a specific timing such as when a line length reaches a predetermined value.

It is disclosed that a reel provided with a transmitter that performs such notification is provided with a fishing rhythm transmitter used in fishing in which a driven body such as a lure is moved by winding a line released from the reel that is a control unit that calculates a winding rhythm of the reel on the basis of a recommended retrieval speed when the driven body performs a desired movement and a winding length per one rotation of a handle of the reel, and a transmitter that transmits a notification signal on the basis of the winding rhythm calculated by the control unit.

SUMMARY

However, in the reel provided with an oscillator as in JP 2015-100295 A, it is necessary to separately provide a speaker for notifying a user, and there has been a problem that an increase in size and cost of an entire device is unavoidable.

The present disclosure is achieved in view of the above-described circumstances, and an object thereof is to provide a fishing reel capable of notifying a user by utilizing a motor used for spool winding, braking force adjustment of a cast brake, clutch switching, drag force adjustment and the like. Other objects of the present disclosure will become apparent by reference to the entire specification.

A fishing reel according to one embodiment of the present disclosure is a fishing reel provided with a braked unit attached to a spool on which a fishing line may be wound, a braking unit that applies a braking force to the braked unit, a braking force adjustment unit that adjusts the braking force of the braking unit, a motor that drives the braking force adjustment unit, and a control unit that controls the motor, in which the control unit controls the motor to repeat forward and backward drive at a frequency in an audible range to allow the motor to generate a notification sound.

A fishing reel according to one embodiment of the present disclosure is a fishing reel provided with a motor that rotates a spool on which a fishing line may be wound, and a control unit that controls the motor, in which the control unit controls the motor to repeat forward and backward drive at a frequency in an audible range to allow the motor to generate a notification sound.

A fishing reel according to one embodiment of the present disclosure is a fishing reel provided with a spool on which a fishing line may be wound, a clutch mechanism for connecting/disconnecting power transmission to the spool, a motor that drives the clutch mechanism, and a control unit that controls the motor, in which the control unit controls the motor to repeat forward and backward drive at a frequency in an audible range to allow the motor to generate a notification sound.

A fishing reel according to one embodiment of the present disclosure is a fishing reel provided with a spool on which a fishing line may be wound, a drag mechanism that prevents breakage of the fishing line by sliding the spool when torque of a predetermined value or larger acts, a motor that drives the drag mechanism, and a control unit that controls the motor, in which the control unit controls the motor to repeat forward and backward drive at a frequency in an audible range to allow the motor to generate a notification sound.

In the fishing reel according to one embodiment of the present disclosure, the control unit controls the motor to generate the notification sound at a predetermined timing.

In the fishing reel according to one embodiment of the present disclosure, the predetermined timing is at least any one of time when the control unit starts, time when the control unit ends, or time of user operation on the control unit.

The fishing reel according to one embodiment of the present disclosure is switchable to an error detection mode, in which the predetermined timing is switching time to the error detection mode.

According to the above-described embodiment, it is possible to provide a fishing reel capable of avoiding an increase in size and cost of an entire device by notifying a user by utilizing a motor used for spool winding, braking force adjustment of a cast brake, clutch switching, drag force adjustment and the like.

DETAILED DESCRIPTION

Hereinafter, an embodiment of a braking force control device and a fishing reel provided with the same according to the present disclosure is specifically described with reference to the accompanying drawings. Components common in a plurality of drawings are assigned with the same reference signs throughout the plurality of drawings. Note that, the drawings are not necessarily drawn to scale for convenience of description.

Figure 1:
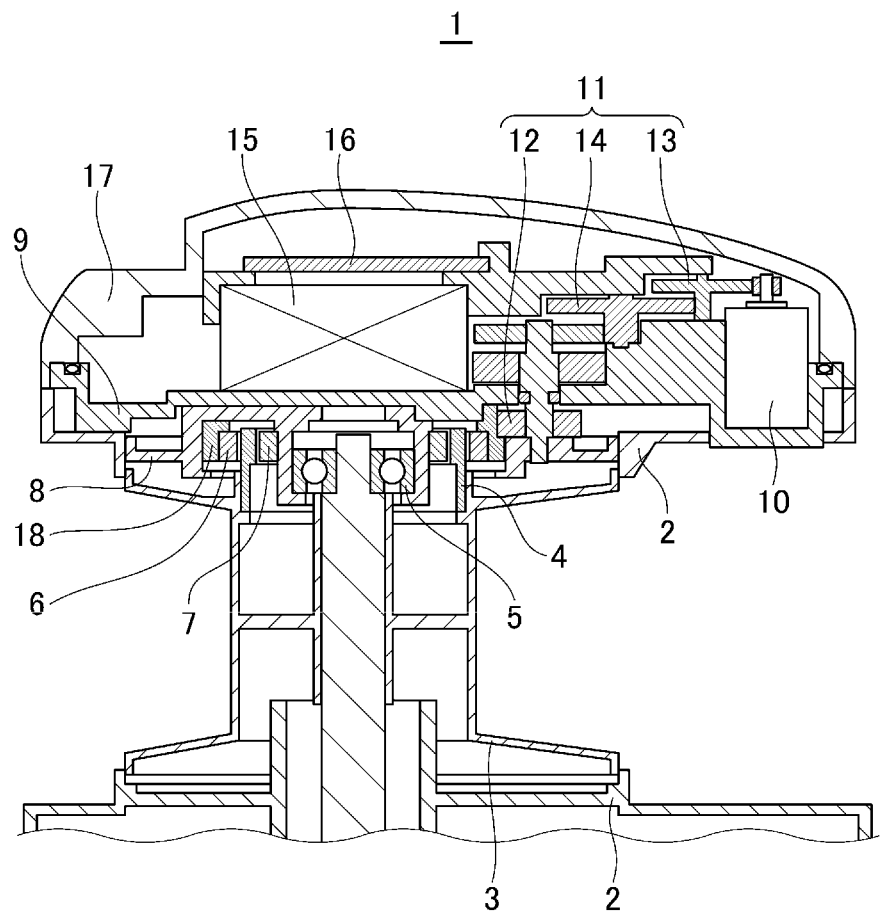
FIG. 1 is a view for illustrating a fishing reel according to one embodiment of the present disclosure.

With reference to FIG. 1, a fishing reel according to one embodiment of the present disclosure is described. FIG. 1 is a cross-sectional view of a fishing reel 1 taken along a central axis of a reduction gear train to be described later. Note that, for the sake of simplicity, some of known functions of the fishing reel 1 are not illustrated or described. In the fishing reel 1 illustrated in FIG. 1, a motor is used for braking torque adjustment of a casting brake.

The fishing reel 1 according to one embodiment of the present disclosure is formed of a frame (reel body) 2, a spool 3, a braked member (induct rotor) 4, a bearing 5, a rotating magnet 6, a fixed magnet 7, a set plate 8, an inner lid 9, a motor 10, a reduction gear train (a first gear 12, a second gear 13, and a third gear 14) 11, a battery 15, a control board 16, and an outer lid 17.

The frame (reel body) 2 may be attached to a fishing rod, and the fishing reel 1 according to one embodiment of the present disclosure includes an operation means (handle) not illustrated as is the case with a conventional fishing reel and may wind a fishing line by rotating the spool in a forward direction by a user operation. Rotation of the handle is transmitted to the spool by a transmission means such as a gear not illustrated.

The fishing reel 1 according to one embodiment of the present disclosure includes a clutch mechanism (clutch unit or clutch means) not illustrated, and a user may select a connected state and a disconnected state of power transmission to the spool 3 by operating the clutch mechanism. In a connected state, winding by the operation means is possible. In a disconnected state, the spool 3 may be freely rotated in forward and backward directions, and the fishing line may be released.

The fishing reel 1 according to one embodiment of the present disclosure may also be provided with a drag mechanism (drag unit or drag means) that prevents breakage of the fishing line by idling the spool 3 when torque of a predetermined value or larger is applied, and a reverse rotation prevention means that prevents reverse rotation of the handle. Furthermore, an oscillator device that uniformly winds the fishing line by reciprocating a position of a guide unit that guides the fishing line according to the rotation of the spool 3 may be provided.

The spool 3 is supported so as to be rotatable with respect to the reel body 2, and may wind the fishing line on an outer periphery thereof by rotating in a forward direction. When casting (throwing) a lure and the like, this releases the wound fishing line by rotating in a backward direction. When a release amount of the fishing line is too much larger than a movement amount of the lure and the like at that time, line entanglement referred to as backlash occurs by an excessive line and hinders normal use of the fishing reel 1. Therefore, an appropriate braking force is applied to the spool 3 by the braking device 20 to prevent the backlash.

The braked unit (induct rotor) 4 is fixed coaxially and non-rotatably with respect to the spool 3, so that braking torque may be applied to the spool 3. The braked unit 4 is made of a conductor such as aluminum, copper, or iron, and is formed into a substantially cylindrical shape. In the fishing reel 1 according to one embodiment of the present disclosure, a so-called eddy current brake that applies a braking force by an eddy current generated in the braked unit 4 is used. That is, when a magnetic field is applied to the braked unit 4 from the outside, the eddy current is generated in the braked unit 4 during motion. An interaction between the eddy current and the magnetic field generates the braking torque proportional to an angular speed of the spool and intensity of the magnetic field.

The set plate 8 may be fixed to the frame 2. When the set plate 8 is fixed to the frame 2, the spool 3 is rotatably and pivotally supported. The fixed magnet 7 and the rotating magnet 6 are held by the set plate 8 to form a braking device 20 to be described later. A side plate unit is formed by integrating the set plate 8, the inner lid 9, and the outer lid 17. A watertight chamber is formed of the inner lid 9 and the outer lid 17, and electric parts such as the board, battery, motor, and sensor may be housed in the watertight chamber.

Subsequently, a configuration of the braking device 20 in the fishing reel 1 according to one embodiment of the present disclosure is described in detail. In the braking device 20, a magnetic field is applied to the braked unit 4 by a magnetic circuit including at least one permanent magnet. In one embodiment of the present disclosure, two permanent magnets form the magnetic circuit, and the magnetic field applied to the braked unit 4 may be adjusted by relatively moving the permanent magnets.

Figure 2:
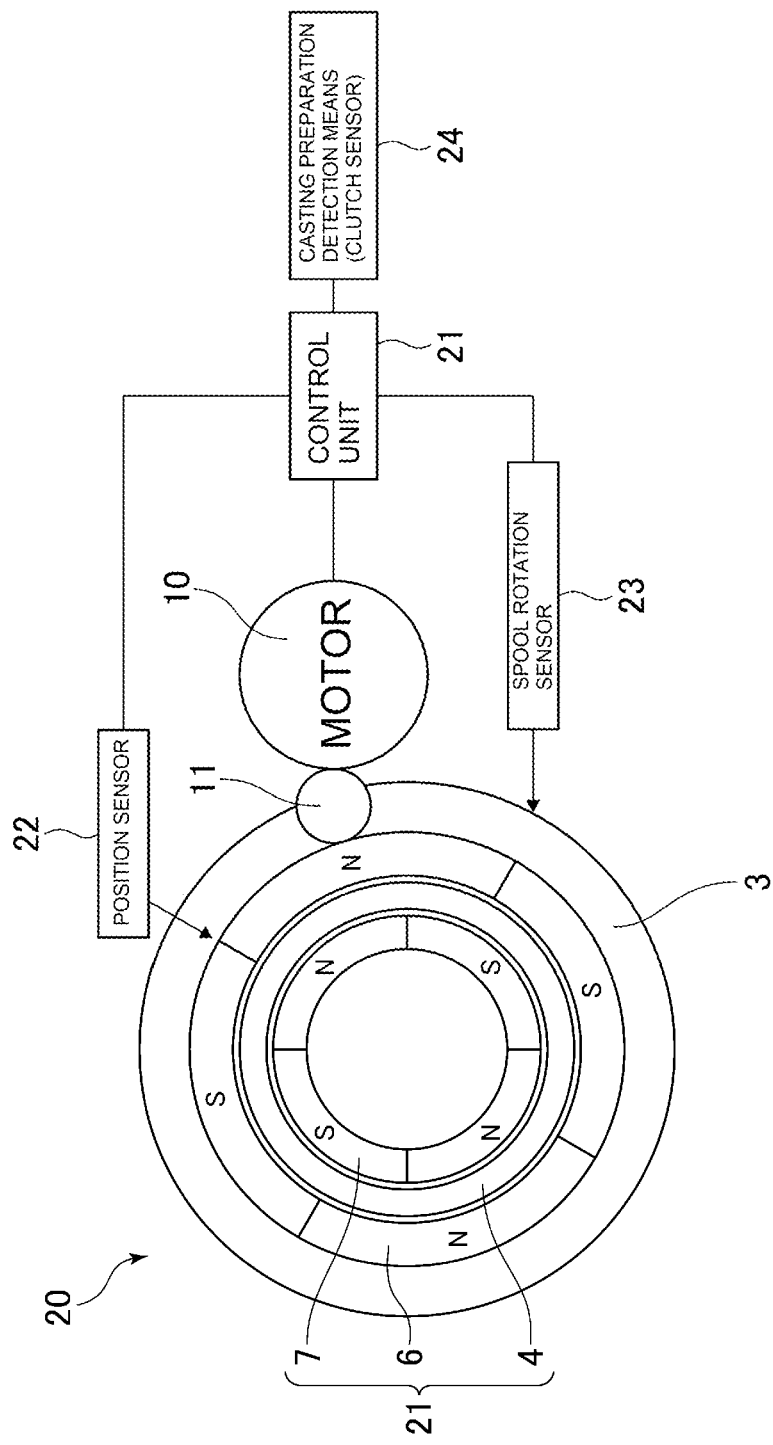
FIG. 2 is a view for illustrating a control method of a braking device in the fishing reel according to one embodiment of the present disclosure.

In the fishing reel 1 according to one embodiment of the present disclosure, as illustrated in FIG. 2, the fixed magnet 7 is arranged on an inner peripheral side of the braked member 4, and the rotating magnet 6 is arranged on an outer peripheral side of the braked member 4. Each of the rotating magnet 6 and the fixed magnet 7 is divided into N equal parts (four equal parts in the example in FIG. 2) in a circumferential direction, and alternately magnetized to N poles and S poles. As a result, the magnetic field penetrating the braked unit 4 is formed.

The rotating magnet 6 is rotationally movable between a maximum braking state and a minimum braking state. Specifically, the rotating magnet 6 is fixed to a magnet holding gear (magnet gear) 18 made of resin and the like including a gear, and the magnet gear 18 is pivotally supported so as to be rotatable at an angle in a range of 0° to 90° with respect to the set plate. The magnet gear 18 receives transmission of rotation from the motor 10 via the reduction gear train 11. As a result, the rotating magnet 6 may be rotated relative to the fixed magnet 7 by the motor 10. The reduction gear train 11 is a known reduction means, and the fishing reel 1 according to one embodiment of the present disclosure is formed of three two-stage gears of the first gear 12, the second gear 13, and the third gear 14. A reduction ratio by the reduction gear train is set to r.

Next, a control method of the braking device 20 in the fishing reel 1 according to one embodiment of the present disclosure is described with reference to FIG. 2. As described above, in the fishing reel 1 according to one embodiment of the present disclosure, after a casting (throwing) state is detected by a clutch sensor (casting preparation detection means or throwing preparation detection means) 24, the rotating magnet 6 is rotated relative to the fixed magnet 7 by the motor 10, so that the braking torque to the spool 3 may be adjusted to a predetermined amount. As necessary, a spool rotation sensor 23 detects a rotational movement amount and a rotational speed of the spool 3 to set to the braking torque according to each situation.

In a control board not illustrated, a control unit 21 formed of a motor driver that applies a current to the motor 10 and an electric part such as a microcomputer on which a program that determines a drive amount to the motor 10 is mounted is arranged. The motor may be positioned by a known method such as feedforward control using a stepping motor or feedback control using a position sensor 22. As a result, the rotating magnet may be moved to a predetermined position to apply a predetermined braking force to the spool.

A fishing reel according to one embodiment of the present disclosure is a fishing reel provided with a braked unit attached to a spool on which a fishing line may be wound, a braking unit that applies a braking force to the braked unit, a braking force adjustment unit that adjusts the braking force of the braking unit, a motor that drives the braking force adjustment unit, and a control unit that controls the motor, in which the control unit controls the motor to repeat forward and backward drive at a frequency in an audible range to allow the motor to generate a notification sound.

According to the fishing reel 1 according to one embodiment of the present disclosure, it is possible to provide the fishing reel capable of avoiding an increase in size and cost of an entire device by notifying the user by utilizing the motor 10 used for braking force adjustment of a cast brake of the spool. More specifically, since it is possible to notify of a status of the reel by a notification sound directly emitted from such motor, a liquid crystal screen and other peripheral devices are unnecessary (for example, in a case where a mobile terminal includes a display unit, various settings of the motor 10 are made by operating the mobile terminal, and a response sound is generated from the motor 10 when the settings are made, so that it may be recognized that the settings are made in the motor 10 as set by the user), and thus, further cost reduction may be achieved.

A fishing reel according to one embodiment of the present disclosure is a fishing reel provided with a motor that rotates a spool on which a fishing line may be wound, and a control unit that controls the motor, in which the control unit controls the motor to repeat forward and backward drive at a frequency in an audible range to allow the motor to generate a notification sound.

According to the fishing reel 1 according to one embodiment of the present disclosure, it is possible to provide the fishing reel 1 capable of avoiding an increase in size and cost of an entire device by notifying the user by utilizing the motor 10 used for spool winding. More specifically, since it is possible to notify of the status of the fishing reel 1 by a notification sound directly emitted from such motor 10 as described above, a liquid crystal screen and other peripheral devices are unnecessary (for example, in a case where a mobile terminal includes a display unit, various settings of the motor 10 are made by operating the mobile terminal, and a response sound is generated from the motor 10 when the settings are made, so that it may be recognized that the settings are made in the motor 10 as set by the user), and thus, further cost reduction may be achieved.

A fishing reel according to one embodiment of the present disclosure is a fishing reel provided with a spool on which a fishing line may be wound, a clutch mechanism for connecting/disconnecting power transmission to the spool, a motor that drives the clutch mechanism, and a control unit that controls the motor, in which the control unit controls the motor to repeat forward and backward drive at a frequency in an audible range to allow the motor to generate a notification sound.

According to the fishing reel 1 according to one embodiment of the present disclosure, it is possible to provide the fishing reel 1 capable of avoiding an increase in size and cost of an entire device by notifying the user by utilizing the motor 10 used for clutch switching. More specifically, since it is possible to notify of a status of the fishing reel 1 by a notification sound directly emitted from such motor as described above, a liquid crystal screen and other peripheral devices are unnecessary (for example, in a case where a mobile terminal includes a display unit, various settings of the motor 10 are made by operating the mobile terminal, and a response sound is generated from the motor 10 when the settings are made, so that it may be recognized that the settings are made in the motor 10 as set by the user), and thus, further cost reduction may be achieved.

A fishing reel according to one embodiment of the present disclosure is a fishing reel provided with a spool on which a fishing line may be wound, a drag mechanism that prevents breakage of the fishing line by sliding the spool when torque of a predetermined value or larger acts, a motor that drives the drag mechanism, and a control unit that controls the motor, in which the control unit controls the motor to repeat forward and backward drive at a frequency in an audible range to allow the motor to generate a notification sound.

According to the fishing reel according to one embodiment of the present disclosure, it is possible to provide the fishing reel capable of avoiding an increase in size and cost of an entire device by notifying the user by utilizing the motor used for drag force adjustment. More specifically, since it is possible to notify of a status of the reel by a notification sound directly emitted from such motor as described above, a liquid crystal screen and other peripheral devices are unnecessary (for example, in a case where a mobile terminal includes a display unit, various settings of the motor 10 are made by operating the mobile terminal, and a response sound is generated from the motor 10 when the settings are made, so that it may be recognized that the settings are made in the motor 10 as set by the user), and thus, further cost reduction may be achieved.

In the fishing reel according to one embodiment of the present disclosure, the control unit controls the motor to generate the notification sound at a predetermined timing. In this manner, it becomes possible to notify the user by the motor without hindering an original use of the motor.

In the fishing reel according to one embodiment of the present disclosure, the predetermined timing is at least any one of time when the control unit starts, time when the control unit ends, or time of user operation on the control unit. In this manner, it becomes possible to notify the user of a timing such as time when this starts, ends, and time of user operation without hindering an original use of the motor.

The fishing reel according to one embodiment of the present disclosure is switchable to an error detection mode, in which the predetermined timing is switching time to the error detection mode. In this manner, presence or absence of occurrence of malfunction of the device may be easily detected. It is possible to improve efficiency of failure cause analysis when malfunction occurs.

Figure 3A:
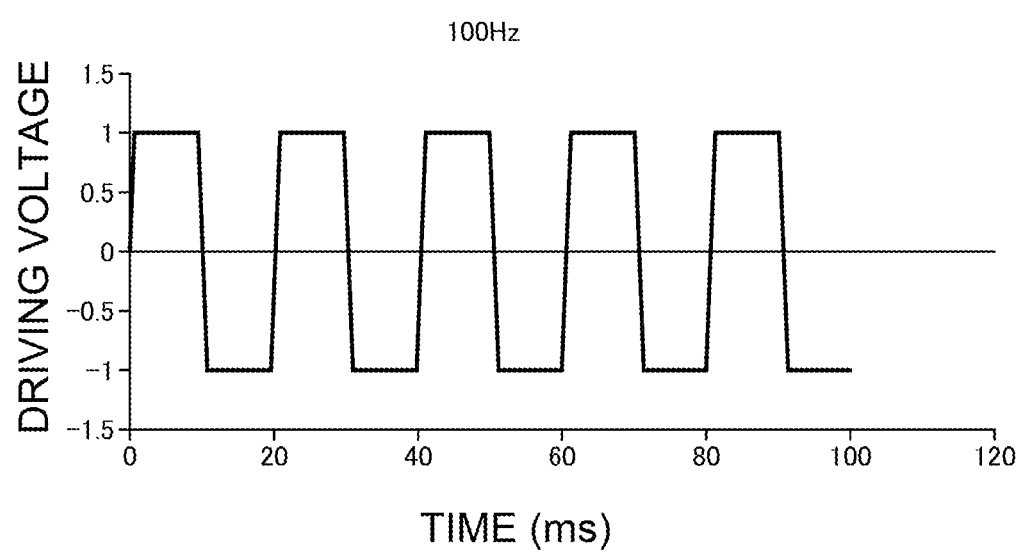
FIGS. 3A and 3B are views for illustrating a method of generating a notification sound for notifying a user using a motor in the fishing reel according to one embodiment of the present disclosure.
Figure 3B:
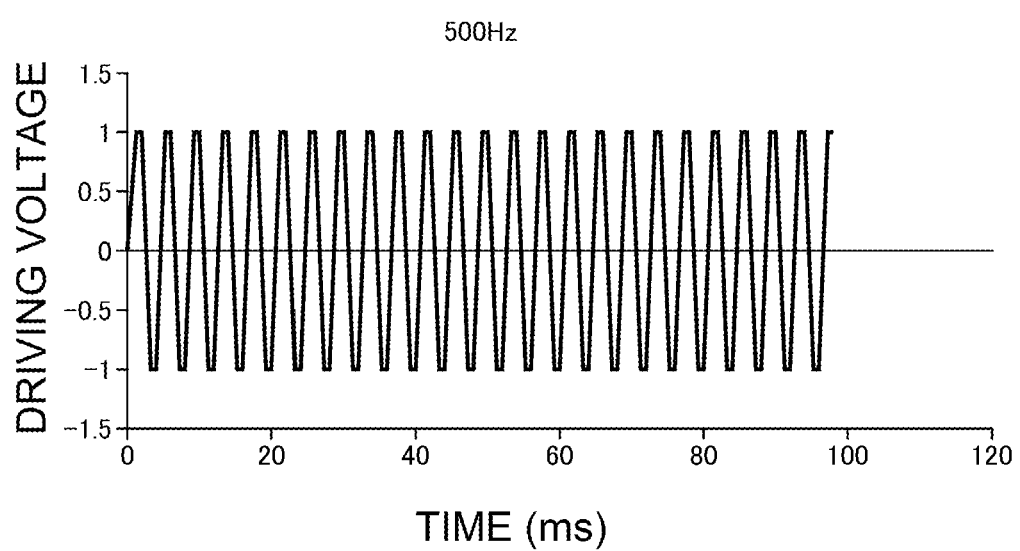

Next, a method of generating the notification sound for notifying the user using the motor 10 is described in detail with reference to FIGS. 3A and 3B. The fixed magnet may be moved to a predetermined position by controlling the motor 10 to drive in a forward direction or a backward direction for a certain period of time by the control unit 21. In contrast, by repeatedly switching between predetermined drive in forward direction and drive in backward direction of the motor 10 at a predetermined frequency, it is possible to generate the notification sound to the user while a rotor position of the motor 10 hardly moves. FIGS. 3A and 3B illustrate an energization waveform to the motor 10 when the notification sound to the user is generated, in which FIG. 3A illustrates a case of driving at a high frequency, and FIG. 3B illustrates a case of driving at a low frequency.

By switching the drive between the forward and backward directions of the motor 10 within an audible range of the user, the rotor of the motor 10 vibrates on the spot, and the vibration is transmitted to the user to become the notification sound. Therefore, a driving frequency of the motor 10 is desirably 20 Hz to 10,000 Hz. At that time, by drive of the motor at a resonance frequency of the motor itself or a resonance frequency of a structural member holding the motor, volume may be increased by increasing amplitude, and the notification to the user may be easily performed.

In this manner, according to the fishing reel 1 according to one embodiment of the present disclosure, the notification sound to the user may be generated by the motor 10 for braking torque adjustment of the casting brake without using a dedicated part such as a speaker or a buzzer. As a result, it is possible to provide the fishing reel 1 that avoids an increase in size and cost of the entire device.

The notification to the user is performed, for example, when the control unit 21 starts. As a result, it is possible to notify the user that the control unit 21 starts. As another method, the notification to the user is performed when the control unit 21 ends. As a result, it is possible to notify the user that the control unit ends. Furthermore, as another method, it is possible to notify the user when the user operates an operation button for operating the control unit 21. Accordingly, operability may be improved. As another method, the user may be notified at the end of casting preparation or when the end of the casting (throwing) is detected. Accordingly, operability may be improved.

While the user is notified, the motor cannot perform the braking torque adjustment of the casting brake, which is its original use. However, the braking torque of the casting brake needs to be adjusted during casting of the lure and the like, and during that time, start and end of the control unit or the button operation of the user is hardly performed. Therefore, even if the user is notified at the above-described timing, the original use of the motor is not hindered, so that the motor may be more effectively utilized.

As another method, an error detection mode may be set in the control unit 21, and the user may be notified at the time of occurrence of a specific event such as button operation in the mode. It is conceivable that this error detection mode is used at the time of failure cause analysis when a malfunction occurs in the reel, for example, at the time of failed reel analysis in a service department.

In the failure in which the motor stops moving, two major causes are electrical factors such as disconnection and battery exhaustion, and mechanical factors such as foreign matter mixing into the gear and the like and part breakage. In a case where the motor stops moving due to the electrical factors, the notification sound to the user cannot be generated by the motor. However, in a case where the motor stops moving due to the mechanical factors, in most cases, the rotor may perform minute rotation on the spot, so that the notification sound to the user may be generated. By using this, it is possible to determine whether the failure is caused by the mechanical factor or the electrical factor without disassembling the device by performing an operation of allowing the fishing reel of which motor stops moving to generate the notification sound. As a result, the failure cause analysis may be made efficient.

The motor for generating the notification sound to the user is not limited to the above-described motor for braking torque adjustment of the casting brake. In addition, the motor of various uses used in the fishing reel may generate the notification sound to the user.

For example, although not illustrated, it is possible to generate the notification sound to the user as in the above-described method by using a motor for spool winding and switching the drive thereof in the forward and backward directions. When the notification sound is generated, the rotor of the motor 10 vibrates on the spot and hardly moves, so that spool winding is not performed. Therefore, by switching the driving method of the motor, the spool winding and the notification to the user may be performed.

Although not illustrated, in a case where the spool winding may be performed when the motor is driven in the forward direction and engaged state/disengaged state of the clutch is intermittently switched when the motor is driven in the backward direction, it is possible to generate the notification sound to the user when the motor is allowed to minutely vibrate in the forward/backward direction at an audible frequency. When the notification sound to the user is generated, the rotor vibrates on the spot and hardly moves, so that the spool winding and clutch state switching are not performed. Therefore, by switching a driving method of the motor, the switching of the clutch state and the notification to the user may be performed. In this example, it is preferable to notify the user at the timing when the switching of the clutch state ends. As a result, it is possible to improve operability of the user while avoiding simultaneously performing clutch switching work and the notification to the user.

As another method, a motor for adjusting a drag set value may also be used. Although not illustrated, when such motor is driven in a forward direction, the drag set value increases, and when such motor is driven in a backward direction, the drag set value decreases. When the motor is allowed to minutely vibrate in forward and backward directions at an audible frequency, the notification sound to the user may be generated. When the notification sound to the user is generated, the rotor vibrates on the spot and hardly moves, so that the drag set value does not change. Therefore, by switching the driving method of the motor, the adjustment of the drag set value and the notification to the user may be performed.

Dimensions, materials, and arrangements of the components described in this specification are not limited to those explicitly described in the embodiment, and the components may be modified to have any dimensions, materials, and arrangements that may fall within the scope of the present disclosure. Components not explicitly described in this specification may be added to the described embodiment, or some of the components described in each embodiment may be omitted.

What is claimed is:

1. A fishing reel comprising:
   a braked unit attached to a spool on which a fishing line may be wound;
   a braking unit that applies a braking force to the braked unit;
   a braking force adjustment unit that adjusts the braking force of the braking unit;
   a motor that drives the braking force adjustment unit; and
   a control unit that controls the motor,
   wherein the control unit controls the motor to repeat forward and backward drive at a frequency in an audible range to allow the motor to generate a notification sound.

2. The fishing reel according to claim 1, wherein the control unit controls the motor to generate the notification sound at a predetermined timing.

3. The fishing reel according to claim 2, wherein the predetermined timing is at least any one of time when the control unit starts, time when the control unit ends, or time of user operation on the control unit.

4. The fishing reel according to claim 2, the fishing reel being switchable to an error detection mode, wherein the predetermined timing is switching time to the error detection mode.

5. A fishing reel comprising:
   a spool on which a fishing line may be wound;
   a clutch mechanism for connecting/disconnecting power transmission to the spool;
   a motor that drives the clutch mechanism; and
   a control unit that controls the motor,
   wherein the control unit controls the motor to repeat forward and backward drive at a frequency in an audible range to allow the motor to generate a notification sound.

6. A fishing reel comprising:
a spool on which a fishing line may be wound;
a drag mechanism that prevents breakage of the fishing line by sliding the spool when torque of a predetermined value or larger is applied;
a motor that drives the drag mechanism; and
a control unit that controls the motor,
wherein the control unit controls the motor to repeat forward and backward drive at a frequency in an audible range to allow the motor to generate a notification sound.

\* \* \* \* \*